United States Patent
Davis et al.

(10) Patent No.: US 6,330,537 B1
(45) Date of Patent: Dec. 11, 2001

(54) AUTOMATIC FILTERING OF TV CONTENTS USING SPEECH RECOGNITION AND NATURAL LANGUAGE

(75) Inventors: Tony Davis; Jean-Claude Junqua; Roland Kuhn, all of Santa Barbara, CA (US); Weiying Li, Montreal (CA); Yi Zhao, Goleta, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/383,758

(22) Filed: Aug. 26, 1999

(51) Int. Cl.[7] .................. G10L 15/18; G10L 13/08; G10L 11/00
(52) U.S. Cl. .................. 704/257; 704/255; 704/251; 704/270; 704/271; 704/272; 704/275; 704/260
(58) Field of Search .................. 704/270, 275, 704/257, 270.1

(56) References Cited

U.S. PATENT DOCUMENTS

| | | |
|---|---|---|
| 5,774,859 | 6/1998 | Houser et al. . |
| 5,819,220 * | 10/1998 | Sarukkai et al. .......... 704/270 |
| 5,832,439 * | 11/1998 | Cox, Jr. et al. .......... 704/275 |
| 5,890,123 * | 3/1999 | Brown et al. .......... 704/275 |
| 6,133,909 * | 10/2000 | Schein et al. .......... 345/327 |

OTHER PUBLICATIONS

VoiceAssist ("VoiceAssist User's Guide," Creative Labs, ©1997).*

"Will ReplayTV make me more popular?, And Other Frequently Asked Questions"; promotional material, www.replaytv.com/replaytv/faq.htm·q7; Aug. 24, 1999, pp. 1–3.

* cited by examiner

*Primary Examiner*—Richemond Dorvil
*Assistant Examiner*—Daniel Nolan
(74) *Attorney, Agent, or Firm*—Harness, Dickey & Pierce, P.L.C.

(57) ABSTRACT

Speech recognition and natural language parsing components are used to extract the meaning of the user's spoken input. The system stores a semantic representation of an electronic program guide, and the contents of the program guide can be mapped into the grammars used by the natural language parser. Thus, when the user wishes to navigate through the complex menu structure of the electronic program guide, he or she only needs to speak in natural language sentences. The system automatically filters the contents of the program guide and supplies the user with on-screen display or synthesized speech responses to the user's request.

7 Claims, 3 Drawing Sheets

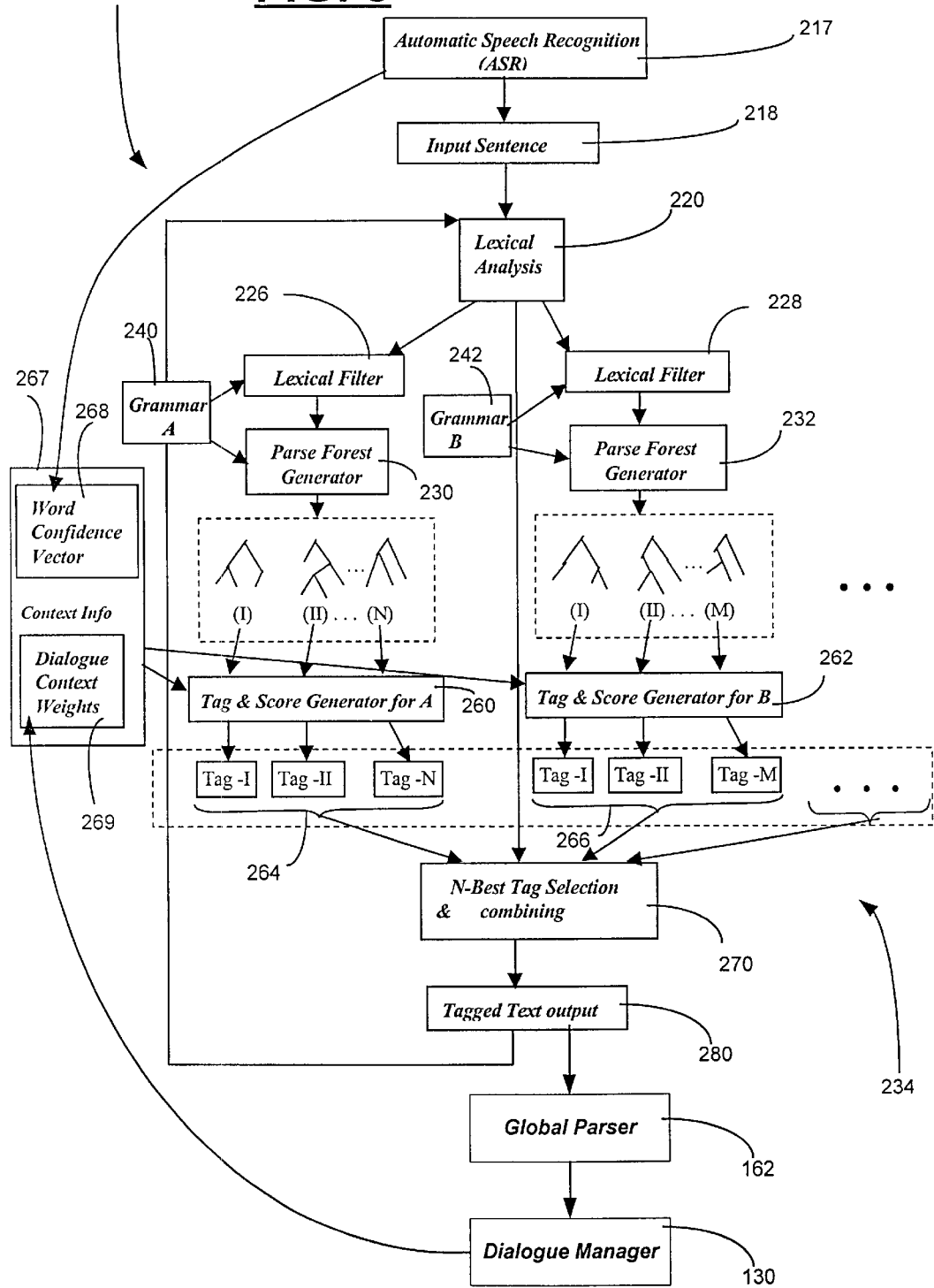

AUTOMATIC FILTERING OF TV CONTENTS USING SPEECH RECOGNITION AND NATURAL LANGUAGE

BACKGROUND AND SUMMARY OF THE INVENTION

The present invention relates generally to interactive television. More particularly, the invention relates to a speech-enabled system for navigating through the complex menu structure of an electronic program guide so that an optimal amount of information may be displayed to the user for subsequent program selection.

One of the problems inherent to accessing television contents using an electronic program guide and conventional remote control is that a complex number of displays or hierarchical menus need to be looked at before the wanted information can be accessed. Using current technology, it can sometimes take several minutes for information on a rotating electronic program guide to be displayed to the user. Moreover, interacting with such on-screen program guide displays is cumbersome, because conventional pushbutton remote controls are clumsy and difficult to operate in darkened rooms.

The present invention addresses this problem by using speech recognition and natural language parsing to automatically filter the contents of the electronic program guide so that an optimal number of fine-tuned selection can be displayed to the user for subsequent selection by voice or through conventional pushbutton control or other means. The invention is thus fast and less intrusive to the user watching a television program, because only a part of the screen needs to be used to display the requested information. Often, it is possible to complete a request in a single sentence. In this case, there is no need to display any information on the TV screen. The system can filter information on a variety of different bases including filtering by time, channel, type of program or movie, actor, director, and so forth. More generally, the filtering may be performed upon any item included in the slots of the frame semantics used by the system to represent meaning.

For a more complete understanding of the invention, its objects and advantages, refer to the following specification and to the accompanying drawings.

BRIEF DESCRIPTION OF THE DRAWINGS

FIG. 3 is a block diagram depicting the components of the local parser of the presently preferred embodiment of the invention.

DESCRIPTION OF THE PREFERRED EMBODIMENT

Figure 1:
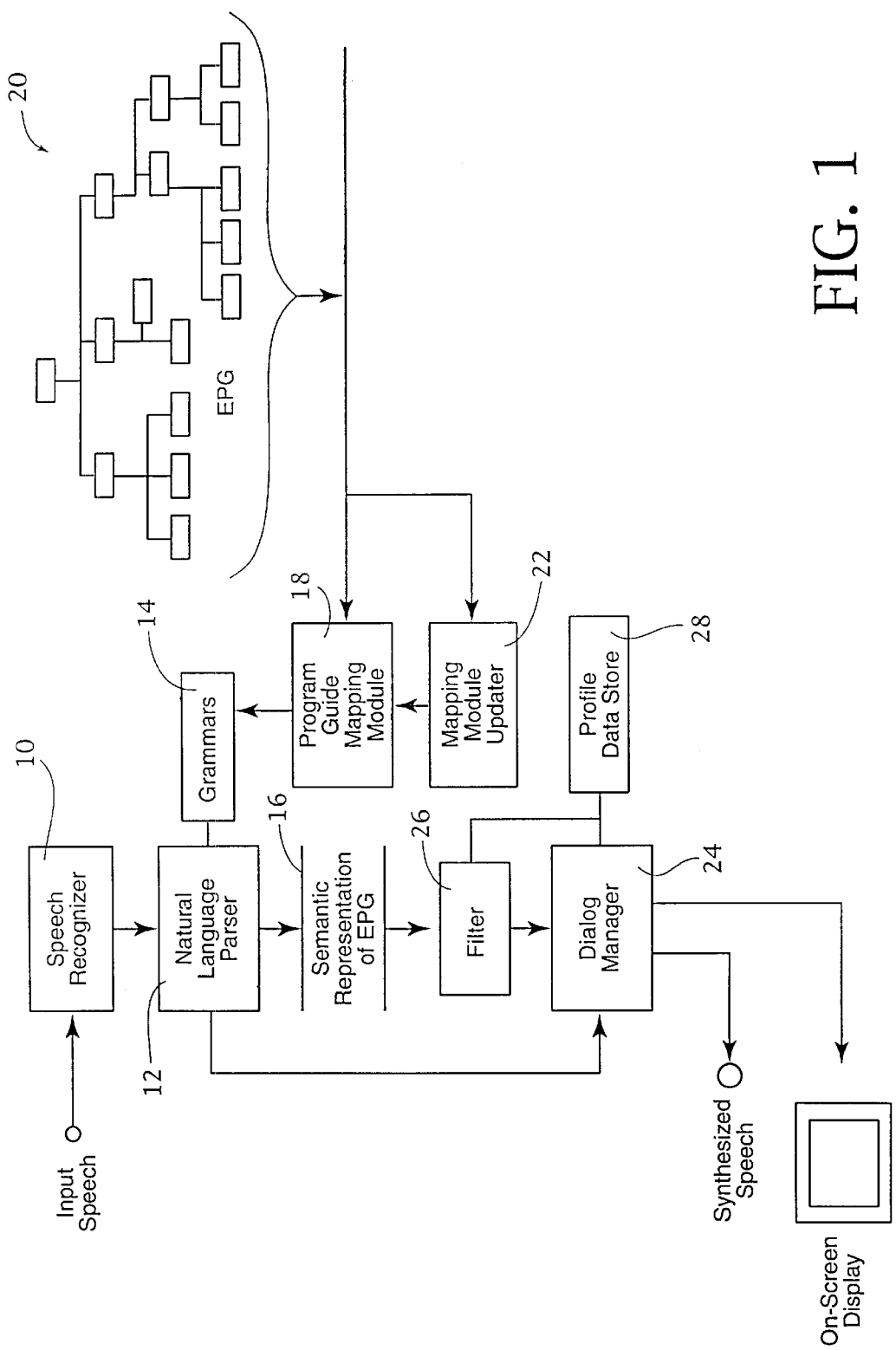
FIG. 1 is a block diagram of the presently preferred embodiment of the invention.

A presently preferred embodiment of the invention is illustrated in FIG. 1. Input speech from the user is supplied through suitable audio interface and digitizer to the speech recognizer module 10. The output of speech recognizer module 10 is supplied to a natural language parser 12. The parser works in conjunction with a set of grammars 14 that define the semantics of what the parser can understand. The details of the parser are discussed more fully below. Essentially, however, the parser operates on a goal-oriented basis, identifying keywords and phrases from the recognized speech and using those recognized words and phrases to fill slots in pre-defined templates or frames that represent different goal-oriented tasks.

The parser also works in conjunction with a semantic representation of the electronic program guide. In FIG. 1, the semantic representation is stored at 16. The electronic program guide is mapped into the grammars 14. The natural language parser thus consults the semantic representation stored at 16 to determine what options or responses the system will present to the user. Because the system allows the user to interact with ever-changing electronic program guide data, a mechanism is provided for downloading the latest electronic program guide contents into the grammars of the local parser. This function is performed by the program guide mapping module 18. The mapping module downloads the electronic program guide, illustrated diagrammatically as a tree structure at 20, and maps the guide's contents into the grammars of the local parser. The program guide mapping module has a priori knowledge of the overall structure of the electronic program guide. Thus the mapping module would be aware, for example, that the electronic programming guide has separate categories for movies, sports, news, weather, and so forth. The mapping module then uses this a priori knowledge in mapping the information found at the intermediate and leaf nodes of the electronic program guide into the grammars. For example, the semantic representation corresponding to movies might, in turn, have slots corresponding to different types of movies, such as comedies, dramas, science fiction, slots for the director's name, for the actors' names, and so forth.

From time to time, the overall structure of the electronic program guide may change. While this happens only rarely, the system is constructed to accommodate such change by including a mapping module updater 22. The module updater can be supplied with update information over the Internet or other telecommunication link. If the overall structure of the electronic program guide changes, such that the program guide mapping module will no longer correctly map all of the program guide's contents, the mapping module is updated by updater 22. The update can be in the form of additional plug-in modules, or an entirely new version of the mapping module.

One objective of the system is to simplify the interaction with the electronic program guide. The system does this by filtering the information found in the electronic program guide, based on the semantics of the user's spoken request. While in some cases, dialog with the user can quickly identify a single program the user is interested in watching, more often a series of dialogs may be needed to hone in on what the user is interested in watching.

To facilitate this, the preferred embodiment employs a dialog manager 24 that uses natural language parser 12 to refine the user's requests to something that can be meaningfully displayed on screen or presented through synthesized speech. The dialog manager has prestored information about the display capabilities of the system, so that it can determine what is an appropriate quantity of information to provide to the user on screen. Presenting the user with fifty movie options in response to a single request might be too many to readily display on the screen, given the limitations of the screen resolution and font height. On the other hand, if only two programs are identified responsive to a given request, the dialog manager may engage the user with additional queries to determine whether the user would like to see more information.

By virtue of using a semantic representation of the electronic program guide, the system performs a filtering of the information contained in the electronic program guide 20. This function is depicted diagrammatically by filter module 26 in FIG. 1.

The dialog manager works in conjunction with a profile data store 28. This data store may contain user profile information, such as data on what the user has previously requested for viewing. This information can be used, for example, to guide the dialog manager and the associated filtering function in identifying programs the user may or may not be interested in viewing. For example, if the user viewed a particular program on a previous night, that fact would be recorded in the data store 28 and the dialog manager could then suppress this program for display on a subsequent night. The profile data store can also be used to store user preferences about how much information the user wishes to have displayed on screen, or supplied by synthesized speech.

The natural language parser 12 together with the semantic representation of the electronic program guide forms the heart of the speech understanding system. The details of the preferred natural language parser will now be described.

Figure 2:
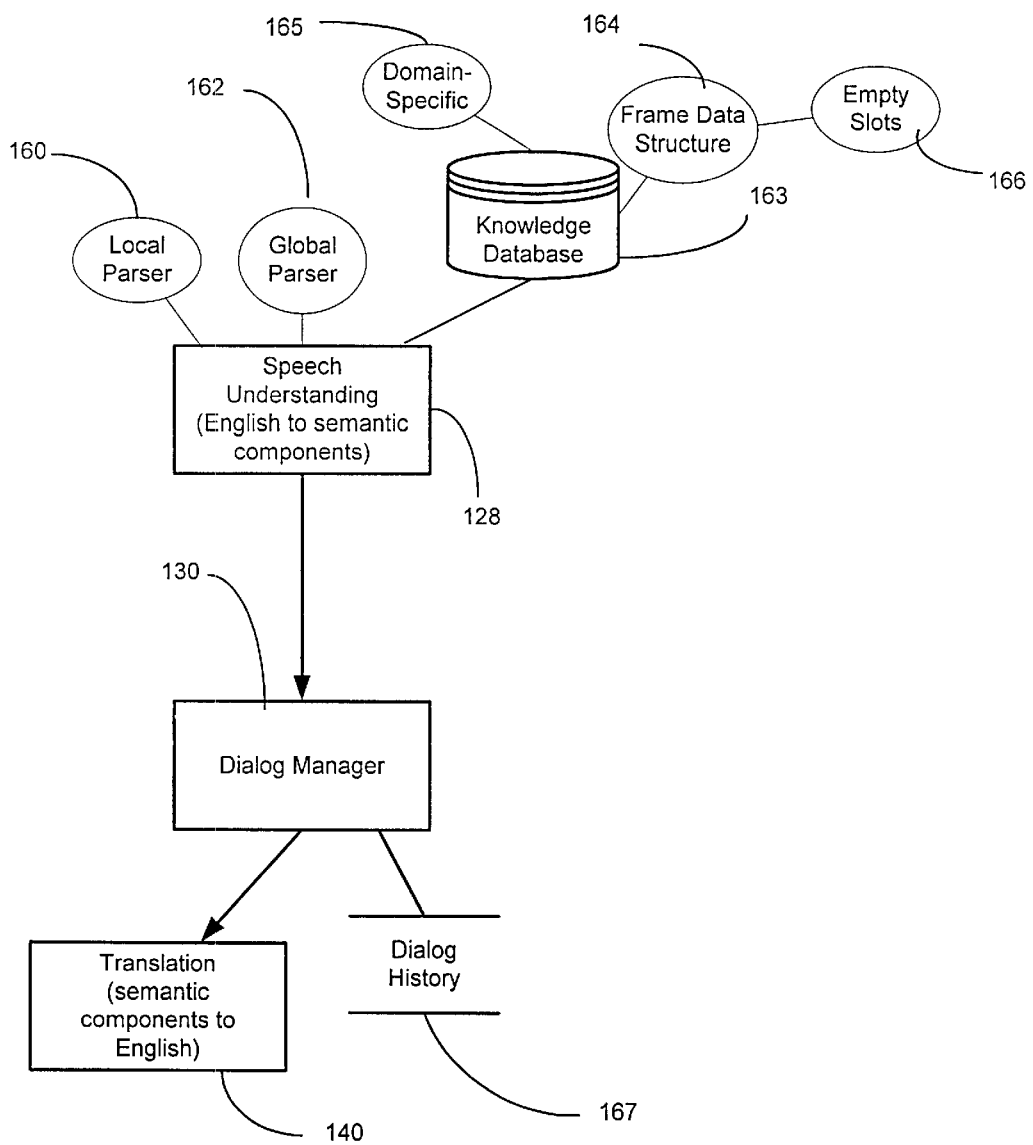
FIG. 2 is a block diagram depicting the components of the natural language parser of the presently preferred embodiment of the invention.

FIG. 2 depicts components of the natural language parser 12 in more detail. In particular, speech understanding module 128 includes a local parser 160 to identify predetermined relevant task-related fragments. Speech understanding module 128 also includes a global parser 162 to extract the overall semantics of the speaker's request.

The local parser 160 utilizes in the preferred embodiment small and multiple grammars along with several passes and a unique scoring mechanism to provide parse hypotheses. For example, the novel local parser 102 recognizes according to this approach phrases such as dates, names of people, and movie categories. If a speaker utters "record me a comedy in which Mel Brooks stars and is shown before January 23rd", the local parser recognizes: "comedy" as being a movie category; "January 23rd" as a date; and "Mel Brooks" as an actor. The global parser assembles those items (movie category, date, etc.) together and recognizes that the speaker wishes to record a movie with certain constraints.

Speech understanding module 128 includes knowledge database 163 which encodes the semantics of a domain (i.e., goal to be achieved). In this sense, knowledge database 163 is preferably a domain-specific database as depicted by reference numeral 165 and is used by dialog manager 130 to determine whether a particular action related to achieving a predetermined goal is possible.

The preferred embodiment encodes the semantics via a frame data structure 164. The frame data structure 164 contains empty slots 166 which are filled when the semantic interpretation of global parser 162 matches the frame. For example, a frame data structure (whose domain is tuner commands) includes an empty slot for specifying the viewer-requested channel for a time period. If viewer 120 has provided the channel, then that empty slot is filled with that information. However, if that particular frame needs to be filled after the viewer has initially provided its request, then dialog manager 130 instructs computer response module 134 to ask viewer 120 to provide a desired channel.

The frame data structure 164 preferably includes multiple frames which each in turn have multiple slots. One frame may have slots directed to attributes of a movie, director, and type of movie. Another frame may have slots directed to attributes associated with the location to which the movie is playing, the channel, and so forth.

The following reference discusses global parsers and frames: R. Kuhn and R. D. Mori, *Spoken Dialogues with Computers* (*Chapter* 14: *Sentence Interpretation*), Academic Press, Boston (1998).

Dialog manager 130 uses dialog history data file 167 to assist in filling in empty slots before asking the speaker for the information. Dialog history data file 167 contains a log of the conversation which has occurred through the device of the present invention. For example, if a speaker utters "I'd like to watch another Marilyn Monroe movie," the dialog manager 130 examines the dialog history data file 167 to check what movies the user has already viewed or rejected in a previous dialog exchange. If the speaker had previously rejected "Some Like It Hot", then the dialog manager 130 fills the empty slot of the movie title with movies of a different title. If a sufficient number of slots have been filled, then the present invention will ask the speaker to verify and confirm the program selection. Thus, if any assumptions made by the dialog manager 130 through the use of dialog history data file 167 prove to be incorrect, then the speaker can correct the assumption.

The natural language parser 12 analyzes and extracts semantically important and meaningful topics from a loosely structured, natural language text which may have been generated as the output of an automatic speech recognition system (ASR) used by a dialogue or speech understanding system. The natural language parser 12 translates the natural language text input 140 to a new representation by generating well-structured tags containing topic information and data, and associating each tag with the segments of the input text containing the tagged information. In addition, tags may be generated in other forms such as a separate list, or as a semantic frame.

Robustness is a feature of the natural language parser 12 as the input can contain grammatically incorrect English sentences, due to the following reasons: the input to the recognizer is casual, dialog style, natural speech can contain broken sentences, partial phrases, and the insertion, omission, or mis-recognition of errors by the speech recognizer even when the speech input is considered correct. The natural language parser 12 deals robustly with all types of input and extracts as much information as possible.

FIG. 3 depicts the different components of the novel local parser 160 of the natural language parser 12. The natural language parser 12 preferably utilized parsing techniques in a multi-pass approach as a fixed-point computation. Each topic is described as a context-sensitive LR (left-right and rightmost derivation) grammar, allowing ambiguities. The following are references related to context-sensitive LR grammars: A. Aho and J. D. Ullman, *Principles of Compiler Design,* Addison Wesley Publishing Co., Reading, Mass. (1977); and N. Tomita, Generalized LR Parsing, Kluwer Academic Publisher, Boston, Mass. (1991).

At each pass of the computation, a generalized parsing algorithm is used to generate preferably all possible (both complete and partial) parse trees independently for each targeted topic. Each pass potentially generates several alternative parse-trees, each parsetree representing a possibly different interpretation of a particular topic. The multiple passes through preferably parallel and independent paths result in a substantial elimination of ambiguities and overlap among different topics. The generalized parsing algorithm is a systematic way of scoring all possible parse-trees so that the (N) best candidates are selected utilizing the contextual information present in the system.

Local parsing system 160 is carried out in three stages: lexical analysis 220; parallel parse-forest generation for each topic (for example, generators 230 and 232); and analysis and synthesis of parsed components as shown generally by reference numeral 234.

Lexical Analysis

A speaker utters a phrase that is recognized by an automatic speech recognizer 217 which generates input sentence 218. Lexical analysis stage 220 identifies and generates tags for the topics (which do not require extensive grammars) in input sentence 218 using lexical filters 226 and 228. These include, for example, movie names; category of movie; producers; names of actors and actresses; and movie summary. A regular-expression scan of the input sentence 218 using the keywords involved in the mentioned exemplary tags is typically sufficient at this level. Also, performed at this stage is the tagging of words in the input sentence that are not part of the lexicon of particular grammar. These words are indicated using an X-tag so that such noise words are replaced with the letter "X".

Parallel Parse-forest Generation

The parser 12 uses a high-level general parsing strategy to describe and parse each topic separately, and generates tags and maps them to the input stream. Due to the nature of unstructured input text 218, each individual topic parser preferably accepts as large a language as possible, ignoring all but important words, dealing with insertion and deletion errors. The parsing of each topic involves designing context-sensitive grammar rules using a meta-level specification language, much like the ones used in LR parsing. Examples of grammars include grammar A 240 and grammar B 242. Using the present invention's approach, topic grammars 240 and 242 are described as if they were an LR-type grammar, containing redundancies and without eliminating shift and reduce conflicts. The result of parsing an input sentence is all possible parses based on the grammar specifications.

Generators 230 and 232 generate parse forests 250 and 252 for their topics. Tag-generation is done by synthesizing actual information found in the parse tree obtained during parsing. Tag generation is accomplished via tag and score generators 260 and 262 which respectively generate tags 264 and 266. Each identified tag also carries information about what set of input words in the input sentence are covered by the tag. Subsequently the tag replaces its cover-set. In the preferred embodiment, context information 267 is utilized for tag and score generations, such as by generators 260 and 262. Context information 267 is utilized in the scoring heuristics for adjusting weights associated with a heuristic scoring factor technique that is discussed below. Context information 267 preferably includes word confidence vector 268 and dialogue context weights 269. However, it should be understood that the parser 12 is not limited to using both word confidence vector 268 and dialogue context weights 269, but also includes using one to the exclusion of the other, as well as not utilizing context information 267.

Automatic speech recognition process block 217 generates word confidence vector 268 which indicates how well the words in input sentence 218 were recognized. Dialog manager 130 generates dialogue context weights 269 by determining the state of the dialogue. For example, dialog manager 130 asks a user about a particular topic, such as, what viewing time is preferable. Due to this request, dialog manager 130 determines that the state of the dialogue is time-oriented. Dialog manager 130 provides dialogue context weights 269 in order to inform the proper processes to more heavily weight the detected time-oriented words.

Synthesis of Tag-components

The topic spotting parser of the previous stage generates a significant amount of information that needs to be analyzed and combined together to form the final output of the local parser. The parser 12 is preferably as "aggressive" as possible in spotting each topic resulting in the generation of multiple tag candidates. Additionally in the presence of numbers or certain key-words, such as "between", "before", "and", "or", "around", etc., and especially if these words have been introduced or dropped due to recognition errors it is possible to construct many alternative tag candidates. For example, an input sentence could have insertion or deletion errors. The combining phase determines which tags form a more meaningful interpretation of the input. The parser 12 defines heuristics and makes a selection based on them using a N-Best candidate selection process. Each generated tag corresponds to a set of words in the input word string, called the tag's cover-set.

A heuristic is used that takes into account the cover-sets of the tags used to generate a score. The score roughly depends on the size of the cover-set, the sizes in the number of the words of the gaps within the covered items, and the weights assigned to the presence of certain keywords. In the preferred embodiment, ASR-derived confidence vector and dialog context information are utilized to assign priorities to the tags. For example applying channel-tags parsing first potentially removes channel-related numbers that are easier to identify uniquely from the input stream, and leaves fewer numbers to create ambiguities with other tags. Preferably, dialog context information is used to adjust the priorities.

N-Best Candidates Selection

At the end of each pass, an N-best processor 270 selects the Nbest candidates based upon the scores associated with the tags and generates the topic-tags, each representing the information found in the corresponding parse-tree. Once topics have been discovered this way, the corresponding words in the input can be substituted with the tag information. This substitution transformation eliminates the corresponding words from the current input text. The output 280 of each pass is fed-back to the next pass as the new input, since the substitutions may help in the elimination of certain ambiguities among competing grammars or help generate better parse-trees by filtering out overlapping symbols.

Computation ceases when no additional tags are generated in the last pass. The output of the final pass becomes the output of the local parser to global parser 162. Since each phase can only reduce the number of words in its input and the length of the input text is finite, the number of passes in the fixed-point computation is linearly bounded by the size of its input.

The following novel scoring factors are used to rank the alternative parse trees based on the following attributes of a parse-tree:

Number of terminal symbols.
Number of non-terminal symbols.
The depth of the parse-tree.
The size of the gaps in the terminal symbols.
ASR-Confidence measures associated with each terminal symbol.
Context-adjustable weights associated with each terminal and non-terminal symbol.

Each path preferably corresponds to a separate topic that can be developed independently, operating on a small amount of data, in a computationally inexpensive way. The architecture of the parser 12 is flexible and modular so incorporating additional paths and grammars, for new topics, or changing heuristics for particular topics is straight forward, this also allows developing reusable components that can be shared among different systems easily.

From the foregoing it will be appreciated that the present invention provides a user friendly and rapid way of interacting with the otherwise complex electronic program guide. Through natural language conversation, the user can ask the system to find information in the program guide, and the returned information is displayed in easy to comprehend pieces. The result is a blend of information presentation, offering the ease of natural language dialog with the straightforward presentation of on-screen display. While the invention has been described in its presently preferred form, it will be understood that the invention is capable of modification without departing from the spirit of the invention as set forth in the appended claims.

What is claimed is:

1. An electronic program guide searching system comprising:
- a speech recognition system having parser for extracting semantic information from a user's input speech;
- a data store for storing a representation of an electronic program guide;
- a mapping module coupled to said data store for updating the contents of said data store from a source of electronic program guide information;
- a dialog manager for filtering said stored electronic program guide representation based on said semantic information and for providing the user with information about available programs in response to the user's input speech.

2. The electronic program guide searching system of claim 1 wherein said dialog manager includes a speech synthesizer for providing the user with synthesized speech information about available programs.

3. The electronic program guide searching system of claim 1 wherein said dialog manager includes an on-screen display module for providing the user with visual display of information about available programs.

4. The electronic program guide searching system of claim 1 wherein said parser is a goal-oriented parser defining a plurality of goal-oriented frames having slots corresponding to information represented in said electronic program guide.

5. The electronic program guide searching system of claim 1 wherein said parser is a natural language parser having a set of predefined grammars that correspond to information represented in said electronic program guide.

6. The electronic program guide searching system of claim 1 wherein said mapping module includes a mapping module updating system for updating the functionality of said mapping module based on information obtained from a remote site.

7. The electronic program guide searching system of claim 1 wherein said dialog manager includes a user profile data store for storing a representation of a user's past use of said searching system, and wherein said dialog manager uses said profile data store to further filter said stored electronic program guide representation.

* * * * *